US005224586A

United States Patent [19]

Naka et al.

[11] Patent Number: 5,224,586

[45] Date of Patent: Jul. 6, 1993

[54] CONTAINER POSITIONING APPARATUS

[75] Inventors: Toshiaki Naka; Akira Motomura, both of Ishikawa, Japan

[73] Assignee: Shibuya Kogyo Co., Ltd., Ishikawa, Japan

[21] Appl. No.: 945,740

[22] Filed: Sep. 16, 1992

[30] Foreign Application Priority Data

Dec. 19, 1991 [JP] Japan ................................ 3-354846

[51] Int. Cl.$^{5}$ ........................................... B65G 17/34

[52] U.S. Cl. ............................ 198/803.11; 198/379; 198/394; 198/803.14; 156/567; 156/DIG. 26; 156/DIG. 27; 269/266

[58] Field of Search ............... 198/377, 379, 385, 394, 198/473.1, 803.11, 803.14; 269/265, 266; 156/566, 567, DIG. 26: DIG. 27

[56] References Cited

U.S. PATENT DOCUMENTS

| | | | |
|---|---|---|---|
| 3,934,714 | 1/1976 | Matsumoto | 198/379 |
| 4,143,754 | 3/1979 | Eldred | 198/394 |
| 4,280,612 | 7/1981 | Nagano | 198/394 |
| 4,529,469 | 7/1985 | Jorss | 198/394 |
| 4,936,560 | 6/1990 | Barozzi | 269/266 |
| 5,029,695 | 7/1991 | Kovara | 198/473.1 |
| 5,137,136 | 8/1992 | Humele | 198/385 |
| 5,150,782 | 9/1992 | Richter | 198/394 |

FOREIGN PATENT DOCUMENTS

| | | |
|---|---|---|
| 35-14741 | 10/1960 | Japan . |
| 53-44951 | 10/1978 | Japan . |
| 57-43532 | 9/1982 | Japan . |
| 4-142240 | 5/1992 | Japan . |

*Primary Examiner*—Joseph E. Valenza
*Attorney, Agent, or Firm*—Flynn, Thiel, Boutell & Tanis et al.

[57] ABSTRACT

A container positioning apparatus as may be used in a labeller is adapted to serve a variety of containers having different configurations. The apparatus comprises a container receptacle on which containers are placed and a support which is located below the receptacle. The container receptacle is supported by a spring so as to be elevatable with respect to the support. The support carries a plurality of pins which are resiliently urged upward. The pins are disposed in a manner to conform the configuration of containers to be positioned, and extend through pin openings formed in the container receptacle. When containers are placed on the container receptacle, which is then depressed, those pins which are located directly below the containers will be depressed together with the container receptacle, whereby those pins which surround the containers and projecting above the container receptacle are effective to position the containers.

9 Claims, 9 Drawing Sheets

CONTAINER POSITIONING APPARATUS

BACKGROUND OF THE INVENTION

The invention relates to a container positioning apparatus which may be used in a rotary labeller, a machine which is used to apply a label to a container or the like. A conventional container positioning apparatus as used in a rotary labeller will be described first with reference to FIG. 9. A container positioning apparatus is entirely shown at 100, and includes a disc-shaped support base 102, a tubular body 106 which is detachably mounted on the support base 102 by means of an interchangeable bolt 104, and a container receptacle 108 which is disposed inside the tubular body 106. The tubular body 106 has an opening 106*a*, which substantially conforms to the configuration of the external peripheral surface of the bottom of the container. The container receptacle 108 is elevatably fitted in the opening 106*a*. A spring 110 is disposed between the bottom surface of the receptacle 108 and the upper surface of the support base 102 for urging the receptacle 108 upward, which is normally positioned by abutment of a flange 108*a* thereof against the inner surface of the tubular body 106 so that the upper surface of the receptacle 108 is level with the upper surface of the tubular body 106.

In the container positioning apparatus 100 illustrated, a container is positioned by placing the container on top of the receptacle 108 and urging the container by a container holder mechanism, not shown, which is located above it so as to fit the container together with the receptacle 108 into the opening 106*a* of the tubular body 106. Accordingly, when the apparatus is to be used with different containers, a number of tubular bodies 106 having respective openings 106*a* which conform to the configuration of the external periphery of the bottom of different containers as well as a corresponding number of container receptacles 108 must be provided, and must be changed each time a different container is used, resulting in a reduced operational efficiency and causing an increased cost.

SUMMARY OF THE INVENTION

Accordingly, it is an object of the invention to provide a container positioning apparatus which can be used with containers having a variety of configurations without requiring a change of parts thereof.

This object is achieved by a container positioning apparatus according to the invention which comprises a support for carrying a plurality of pins in a vertically movable manner, first means for urging the respective pins upwardly, a container receptacle elevatably supported on the support and formed with pin openings through which the respective pins can extend, and second means for urging the container receptacle upwardly.

DETAILED DESCRIPTION OF EMBODIMENTS

Figure 1:
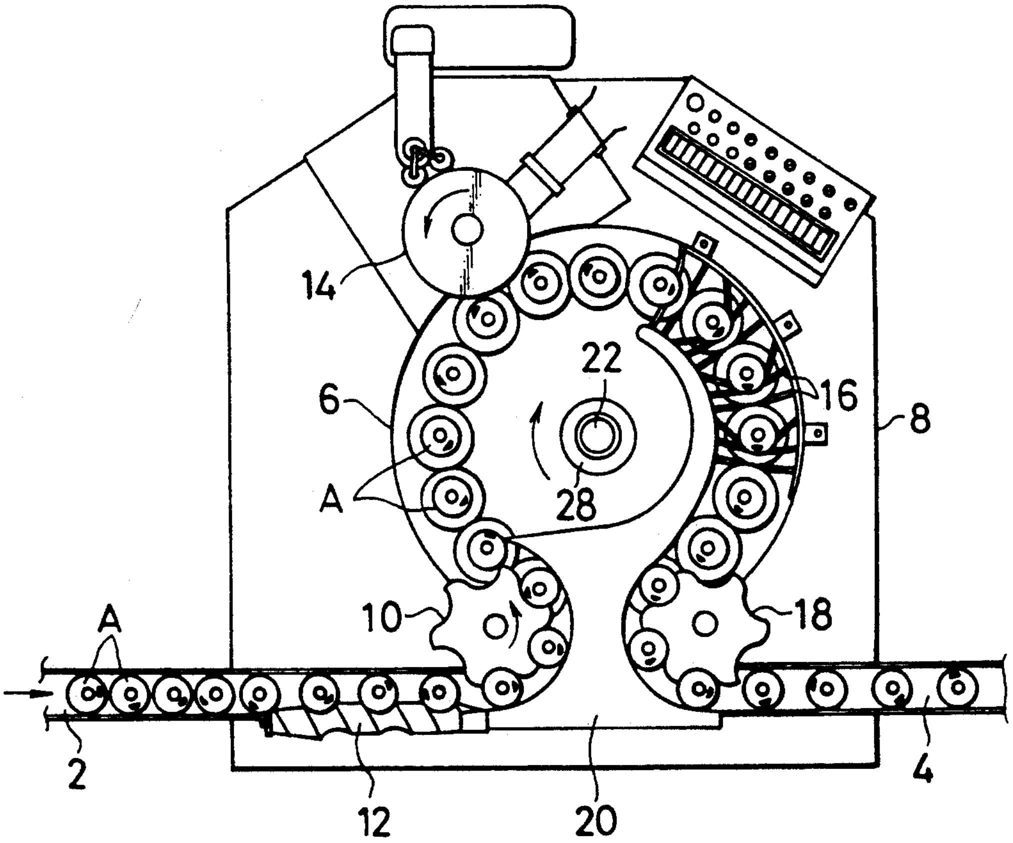
FIG. 1 is a plan view of an entire labeller which is provided with a container positioning apparatus according to one embodiment of the invention.
Figure 2:
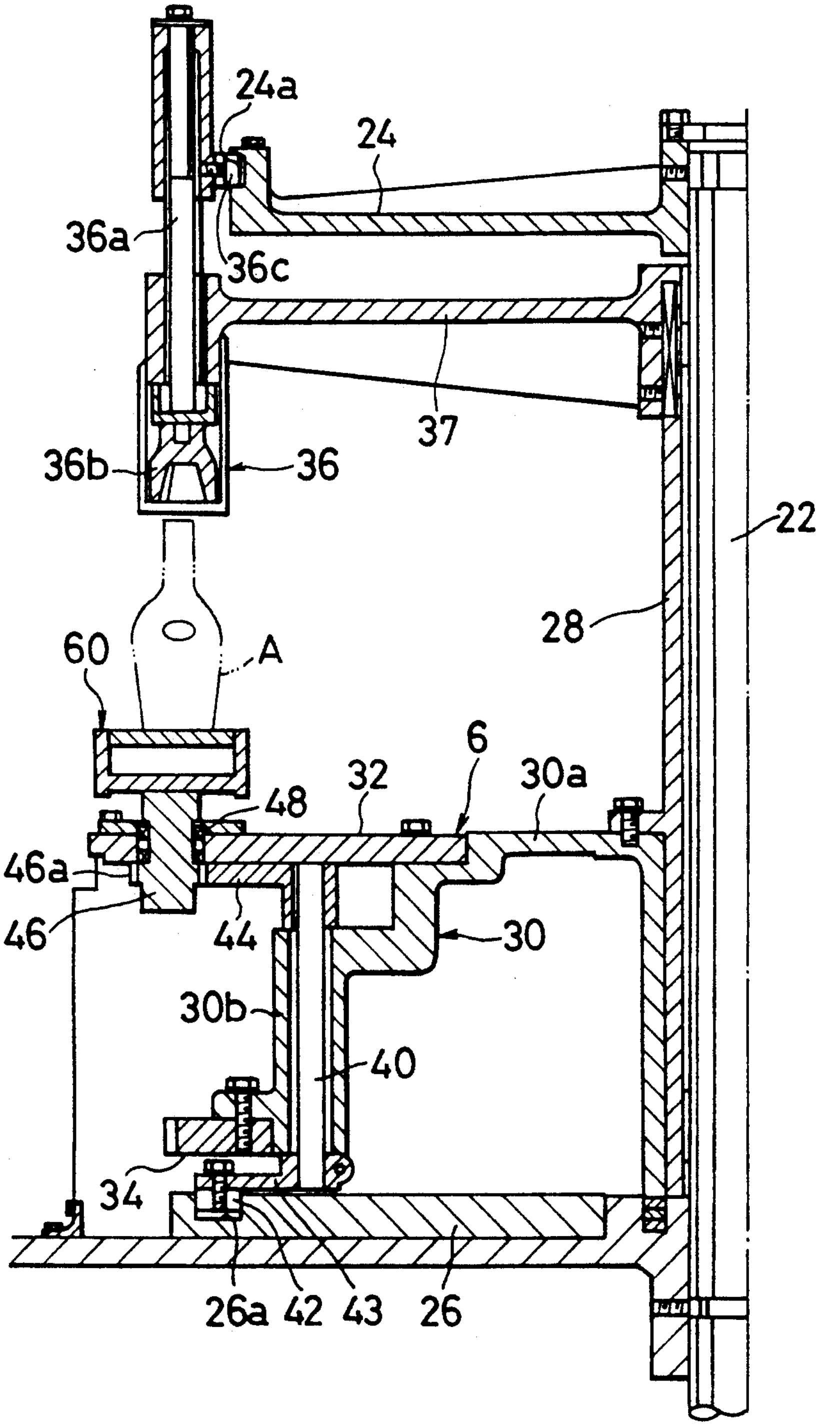
FIG. 2 is a longitudinal section of the apparatus.
Figure 3:
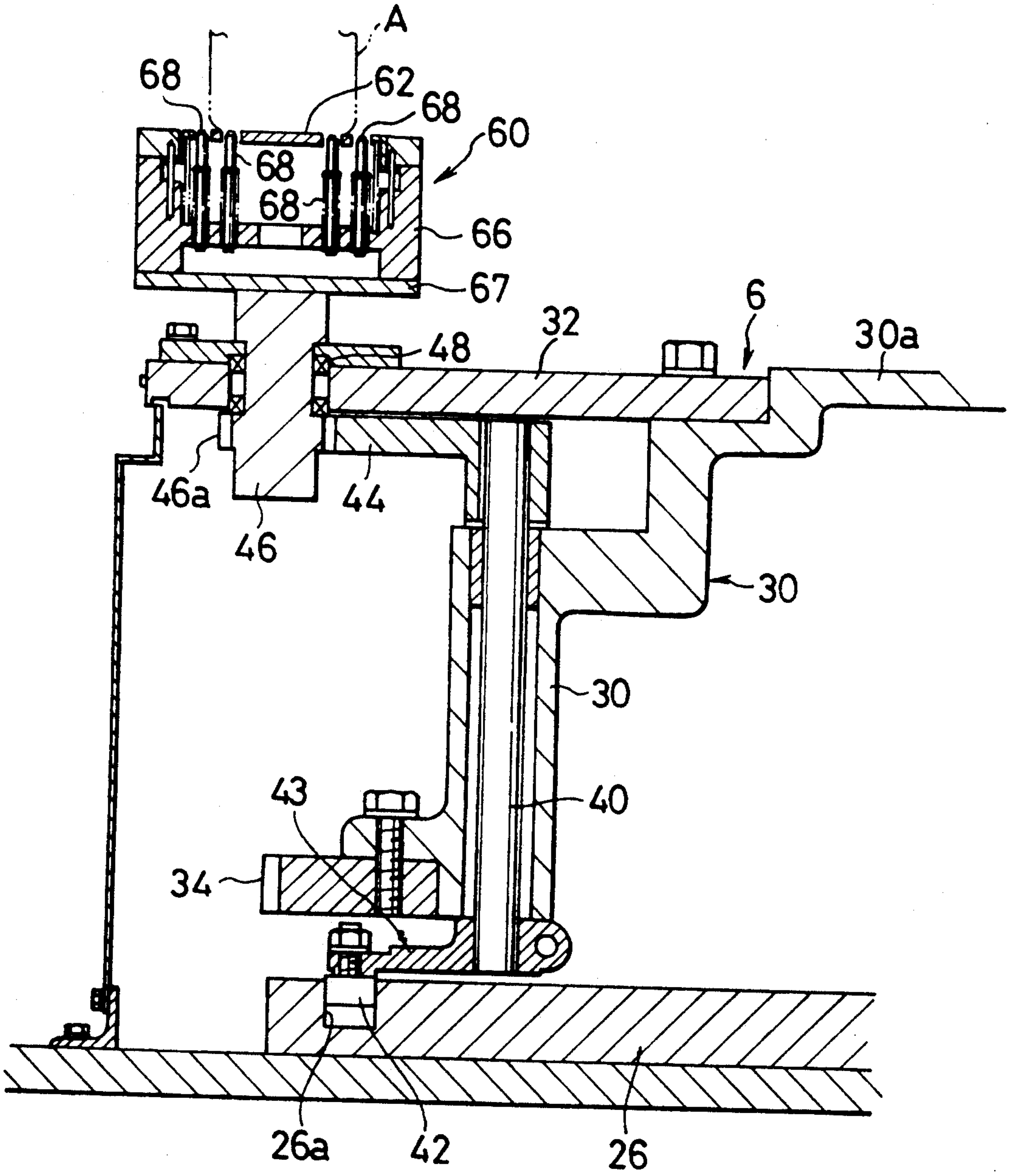
FIG. 3 is a fragmental view, to an enlarged scale, of FIG. 2.

Reffering to the drawings, several embodiments of the invention will now be described. FIG. 1 shows a general arrangement of a labeller in which a container positioning apparatus according to one embodiment of the invention is incorporated, in plan view, FIG. 2 is a longitudinal section thereof, and FIG. 3 is a fragmental view, to an enlarged scale, of FIG. 2. Refferring to these Figures, a supply conveyor 2 is used to supply containers A while a discharge conveyor 4 represents the downstream end of the supply conveyor 2. A labeller includes a rotatable body 6 mounted on a machine base 8 across which the conveyors 2, 4 extend. A supply side star wheel 10 is disposed on one side of the supply conveyor 2 and is adapted to rotate in synchronism with a timing screw 12, so that the containers A, which are aligned at a given spacing by means of the timing screw 12, may be successively supplied onto the rotatable body 6. A labelling mechanism 14 is conventional in itself and is mounted on the machine base 8. A plurality of brush members 16 are disposed downstream of the labelling mechanism, and a discharge side star wheel 18 acts to deliver containers A onto the discharge conveyor 4 from the rotatable body 6. A guide 20 is disposed between the both star wheels 10, 18 for guiding the delivery of the containers A between the supply conveyor 2, the rotatable body 6 and the discharge conveyor 4.

Referring to FIG. 2, a main shaft 22 is vertically disposed and is fixed in position, with a pair of disc-shaped cam plates 24, 26 secured to the top and the bottom end thereof. A cylindrical member 28 is rotatably fitted around the shaft 22 in a region between the both cam plates 24, 26, and an annular member 30 which is substantially channel-shaped in cross section is secured to the bottom region of the cylindrical member 28 with its opening facing downwardly. In its top region, the annular member 30 includes a horizontal portion 30*a* on which an annular table plate 32 is mounted. The cylindrical member 28, the annular member 30, and the table plate 32 constitute together the rotatable body 6 in combination with a top disc 37 which supports a container holder mechanism 36 to be described later.

The annular member 30 includes a peripheral cylindrical portion 30*b* which continues from and extends downwardly from the horizontal portion 30*a*, and on which a table rotating gear 34 is fixedly mounted in the bottom region thereof, for meshing engagement with a drive gear of a drive source, not shown. The rotatable body 6 is adapted to rotate about the axis of the main shaft 22 when the table rotating gear 34 is driven for rotation.

A plurality of container positioning appratus 60 (the detailed construction of which is not illustrated in FIG.

2) are located on the table plate 32, which forms part of the rotatably body 6, and are circumferentially spaced apart for allowing containers A to be placed thereon and positioned as they are successively supplied by the supply side star wheel 10, while a plurality of container holder mechanisms 36 are located on the top disc 37, which is located above the table plate 32, in vertical alignment with the respective container positioning apparatus 60 for holding the top ends of the containers A and urging them downward, as will be further described later.

A support shaft 40 is rotatably fitted in the peripheral cylindrical portion **30*b* of the annular member 30, with a cam follower 42 being mounted on the lower end of the support shaft 40 through an arm 43. The cam follower 42 engages a cam groove 26*a* formed in the upper surface of the cam plate 26. On the other hand, a gear 44, which operates to rotate the container positioning apparatus 60, has its one end fitted around the top end of the support shaft 40. A rotatable shaft 46, which supports each container positioning apparatus 60, is rotatably mounted on the table plate 32 by means of bearing 48. A gear 46*a* is formed around the outer periphery of the rotatable shaft 46 and meshes with the gear 44 disposed on the top end of the support shaft 40. A support 66 for the container positioning apparatus 60 is fixedly mounted on the top end of the rotatable shaft 46 through a fixing plate 67, with a container receptacle 62 being supported at the top surface of the support. Accordingly, as the rotatable body 6 rotates, the cam follower 42 which is engaged with the cam groove 26*a* formed in the lower cam plate 26 has its movement transmitted through the arm 43 and the support shaft 40 to the upwardly located gear 44, causing a rotation of the rotatable shaft 46, with consequence that the container positioning apparatus 60 rotates about the rotatable shaft 46 relative to the rotatable body 6 while itself rotating about the main shaft 22 together with the rotatable body 6**.

The container holder mechanism 36 which is disposed above the respective container positioning apparatus 60 comprises an elevatable rod **36*a* which is supported in an elevatable manner by the disc 37 which is secured to the top end of the cylindrical member 28 for integral rotation therewith, and a holder member 36*b* for holding the head of the container A. A cam follower 36*c* is mounted on the elevatable rod 36*a* and engages a cam groove 24*a* formed in the upper cam plate 24. Accordingly, as the rotatable body 6 rotates, the container holder mechanism 36 can be moved up and down in accordance with the profile of the cam groove 24*a* while rotating together with the container positioning apparatus 60** located below it.

Figure 4:
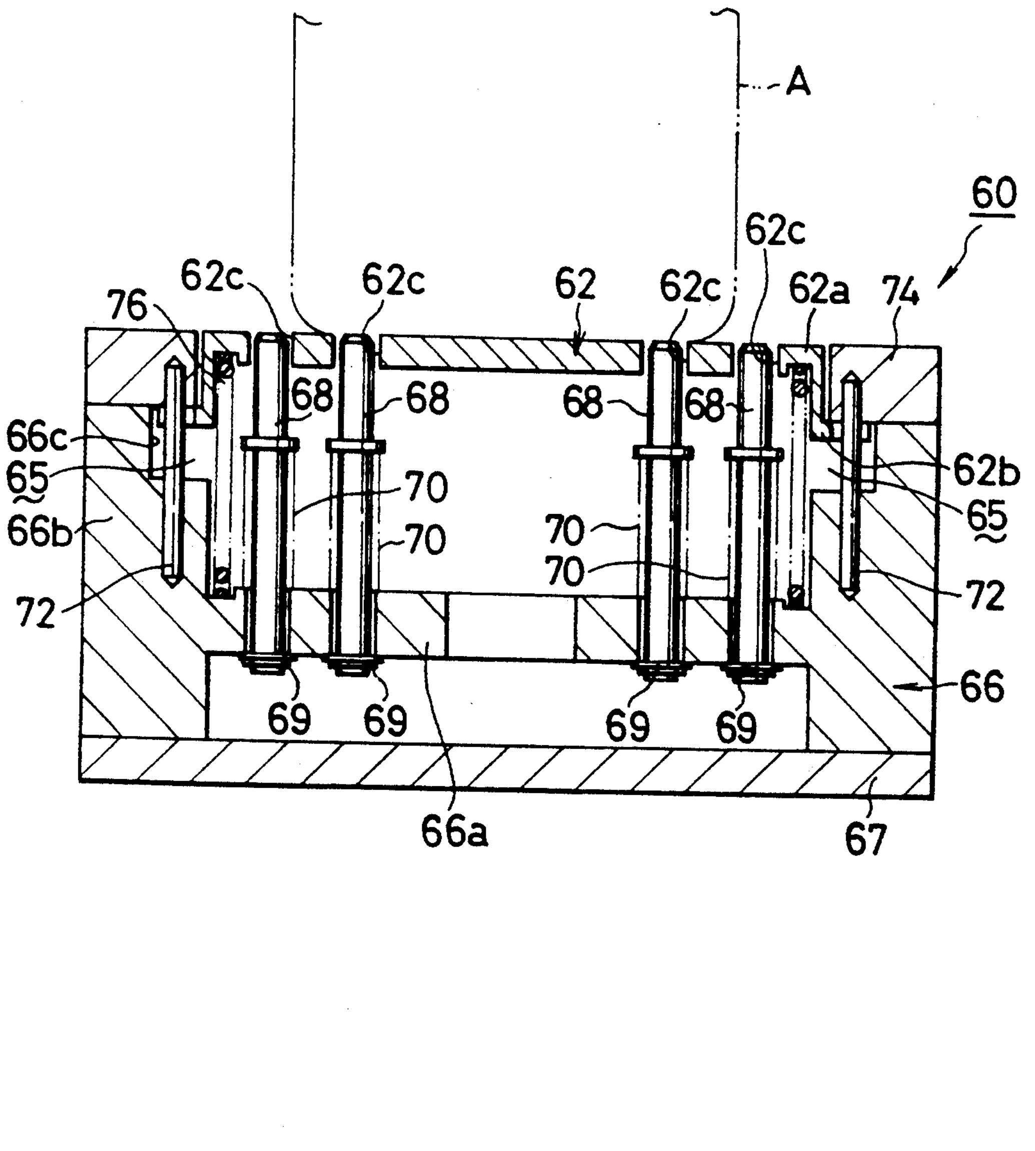
FIG. 4 is a longitudinal section of the container positioning apparatus.

The construction of the container positioning apparatus will now be described in more detail with reference to FIGS. 4 and 5. The support 66 for the container positioning apparatus 60 includes a disc-shaped portion **66*a* and a cylindrical portion 66*b* which surrounds and extends above and below the disc-shaped portion 66*a*, with a plurality of pins 68 being mounted in the disc-shaped portion 66*a*. These pins 68 vertically extend through the disc-shaped portion 66*a*, and are urged upward by springs 70 which are disposed on the surface thereof. At its lower end, the pin 68 is provided with a stop 69, which abuts against the lower surface of the disc-shaped portion 66*a* to stop the upward movement of the pin. An annular top plate 74 is secured to the cylindrical portion 66*b* by means of connecting pins 72. An annular recess 66*c* is formed around the inner periphery of the cylindrical portion 66*b* in its top region, forming a space 65 together with the annular top plate 74**.

The container receptacle 62 includes a plane portion **62*a* which fits in the inner periphery of the annular top plate 74, and a flange 62*b* which depends therefrom around the outer periphery. The flange 62*b* is carried by the connecting pins 72 in an elevatable manner, and is urged upwardly by a spring 76 which is disposed between the lower surface of the plane portion 62*a* toward its outer periphery and the upper surface of the disc-shaped portion 66*b*. Accordingly, the container receptacle 62 can be moved up and down, as guided by the connecting pins 72, in an extent defined by the space 65 located between the support 66 and the annular top plate 74. The container receptacle 62 is formed with pin openings 62*c*, which are located to correspond to respective pins 68 so as to permit each pin 68 to extend therethrough. When the container receptacle 62 and the pins 68 are urged upwardly by respective associated springs 76 and 70, respectively, the upper surface of the container receptacle 62 and the upper end face of the respective pins 68 are substantially level with the upper surface of the annular top plate 74**.

Figure 5:
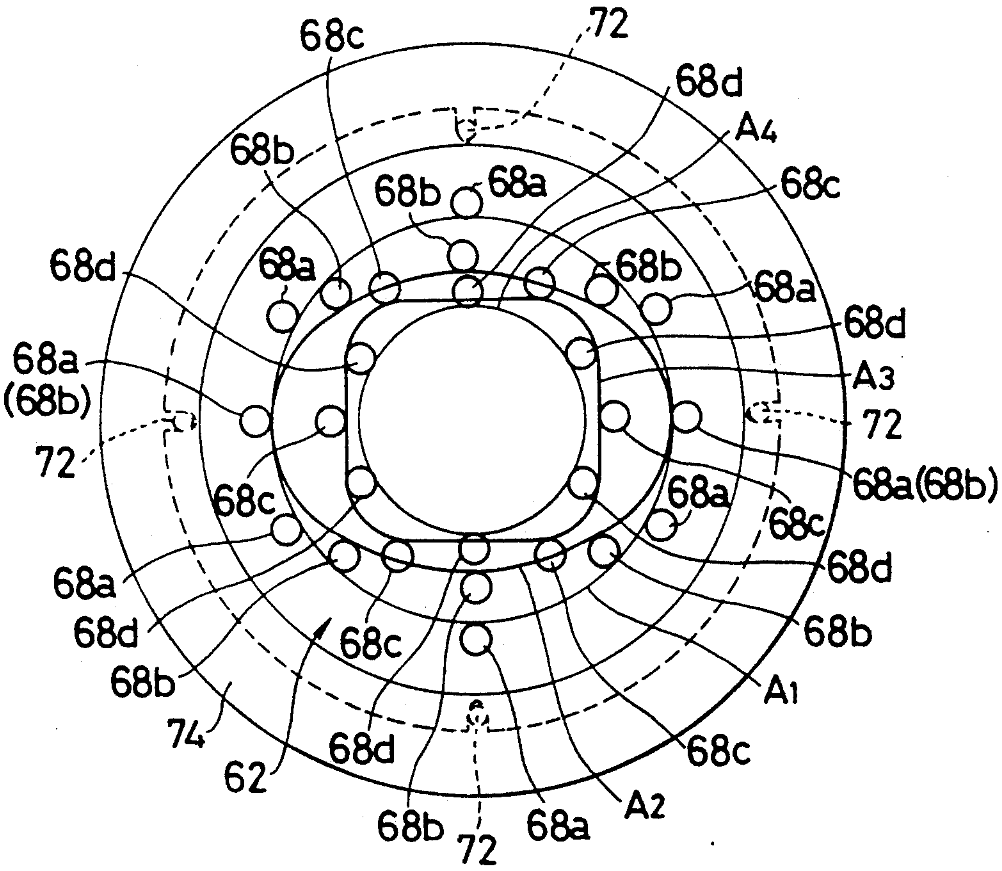
FIG. 5 is a plan view of the container positioning apparatus.
Figure 6:
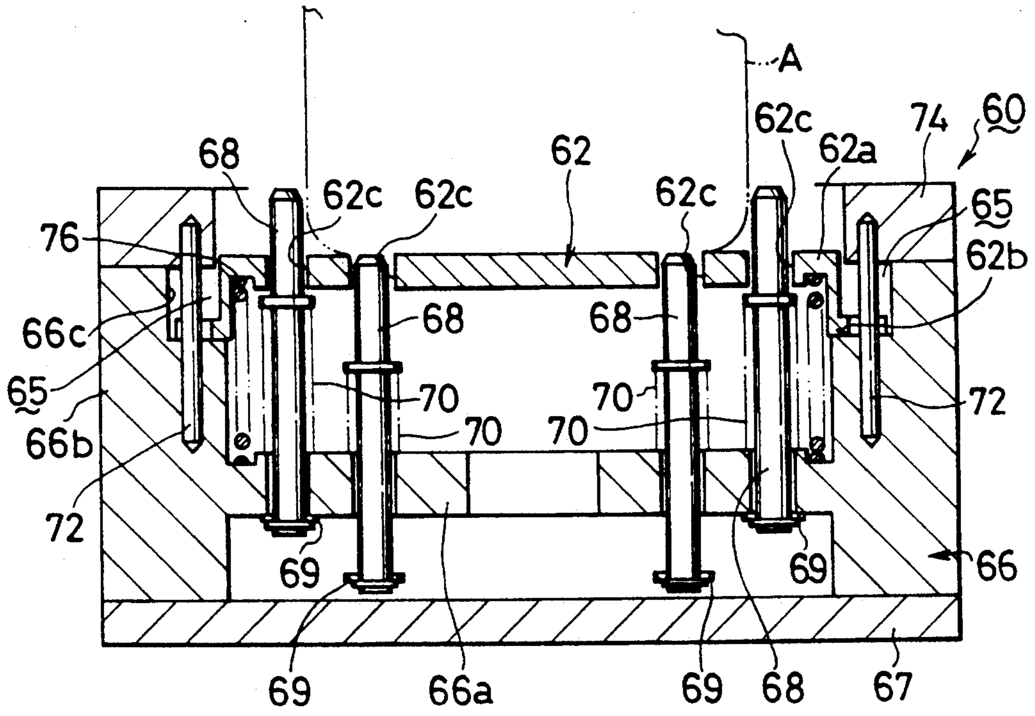
FIG. 6 is a longitudinal section of the container positioning apparatus shown in FIG. 4, illustrating an operating condition thereof.

As shown in FIG. 5, the plurality of pins 68 mounted in the support 66 are positioned so as to conform to the outer profiles A1, A2, A3, A4 of various container which are to be positioned by the apparatus. Considering a big round bottle A1, for example, pins **68*a* which are located radially outermost, are disposed so as to surround the periphery of the container. For an elliptical bottle A2, pins 68*b* are disposed so as to conform to the outer periphery thereof. For a square bottle A3 or a small round bottle A4, pins 68*c* or 68*d* are correspondingly disposed so as to conform to the outer periphery of the respective bottles. It is to be noted that part of these pins, for example, 68*a*, may serve a plurality of bottles, for example, A1 and A2**.

The operation of the container positioning apparatus 60 will now be described. As the supply side star wheel 10 delivers containers A onto the container receptacle 62 of the container positioning apparatus 60, the container positioning apparatus 60 and the container holder mechanism 36 which is located above the apparatus 60 rotate integrally as the rotatable body 6 rotates while lowering the container holder mechanism 36 to hold the top end of the container A, followed by a further depressing movement of the container A. As the container A is depressed, the container receptacle 62 as well as pins 68 which are located inside the outer profile of the container A or located below the bottom surface of the container A will also be depressed. The rest of pins remain in their position as urged by the spring 70, thus projecting through the pin openings **62*c* above the container receptacle. In this manner, the container A is positioned and held in place by these remaining pins, as shown at 68*a***, which are located around the profile of the container.

After being placed on the container receptacle 62 and held in place and depressed by the container holder mechanism 36, the container A as positioned by the container positioning apparatus 60 rotates to a given location, where it is transferred to the labelling mechanism 14 to have a label applied thereto. The label which is applied to the container A is held in close adherence thereto by means of the brush members 16. Subsequently, the container holder mechanisms 36 is raised to release the container A, which is therefore allowed to be carried by the discharge side star wheel 18 to be delivered onto the discharge conveyor 4.

In this manner, the container positioning apparatus 60 of the described embodiment allows any one of a variety of containers A1, A2, A3 and A4 having different configurations to be accurately positioned and held in place without requiring a change of parts or members (such as the container receptacle 62 and the annular top plate 74), and also allows an error in the position where the container A is placed to be readily corrected for, thus improving the operational efficiency and enabling a resulting saving in the cost.

While the container positioning apparatus 60 is used in the described embodiment as a rotary mechanism which causes the container A to be rotated during a labelling operation, the rotary mechanism is not limited thereto, and may be served by the container holder mechanism 36 which holds the top end of the container A which is then constructed as a container rotating mechanism. Where the container A is of an increased size, a pair of upper and lower container rotating mechanisms may also be provided. While the disposition of the pins 68 have been exemplified for a big round bottle, an elliptical bottle, a square bottle, and a small round bottle as a variety of containers having different outer profiles, it should be understood that the disposition of these pins is also applicable to other bottles having different configurations. While the container positioning apparatus 60 has been described as applied to a rotary labeller, the apparatus may be incorporated into a line labeller where it serves holding and positioning various containers.

Figure 7:
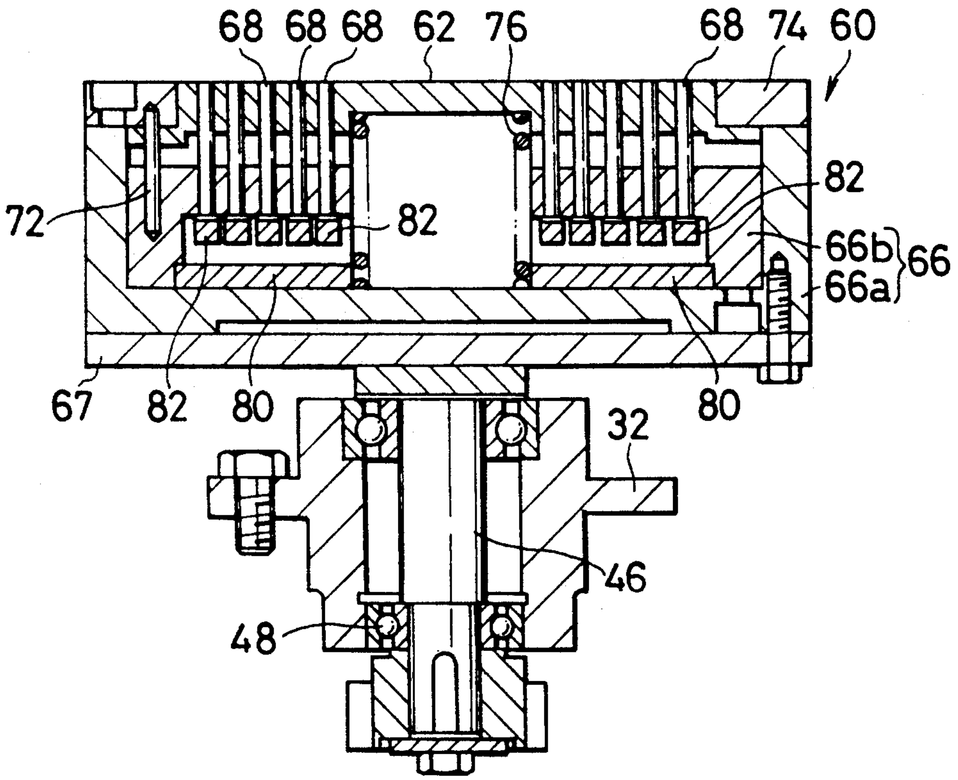
FIG. 7 is a longitudinal section of a container positioning apparatus according to another embodiment of the invention.

FIG. 7 shows a second embodiment in which corresponding parts are designated by like reference characters as before and therefore will not be described specifically. In this embodiment, the spring 70 used in the described embodiment as a resilient bearing member which supports the pin 68 is replaced by magnets 80, 82. Specifically, the support 66 comprises two members ***66a*, *66b*, and the magnets 80 are disposed on the lower member *66b*, while each pin 68 extends through the upper member *66a* and fixedly carries a magnet 82 on its bottom end. The magnets 80, 82 are oriented so that poles of like polarity oppose each other, thereby utilizing the magnetic repulsion to urge the pin 68 upwardly. In this embodiment, the density of pins 68** may be increased as compared with that achievable with the use of springs, and accordingly, an accommodation is possible for an increased number of variety of containers which in addition can be positioned more accurately.

Figure 8:
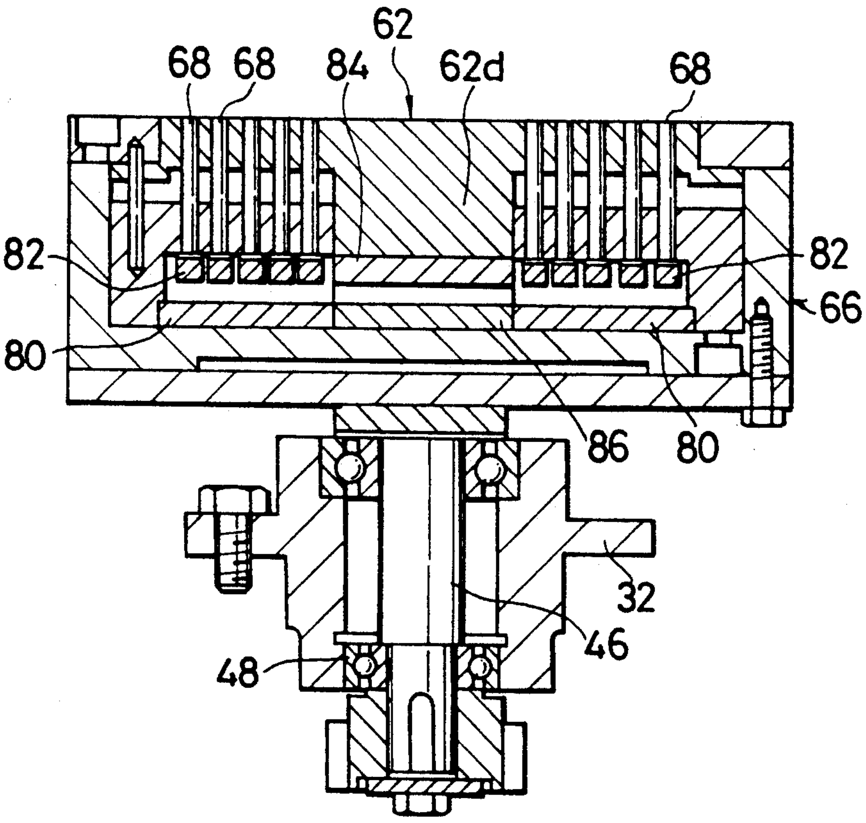
FIG. 8 is a longitudinal section of a container positioning apparatus according to a further embodiment of the invention.
Figure 9:
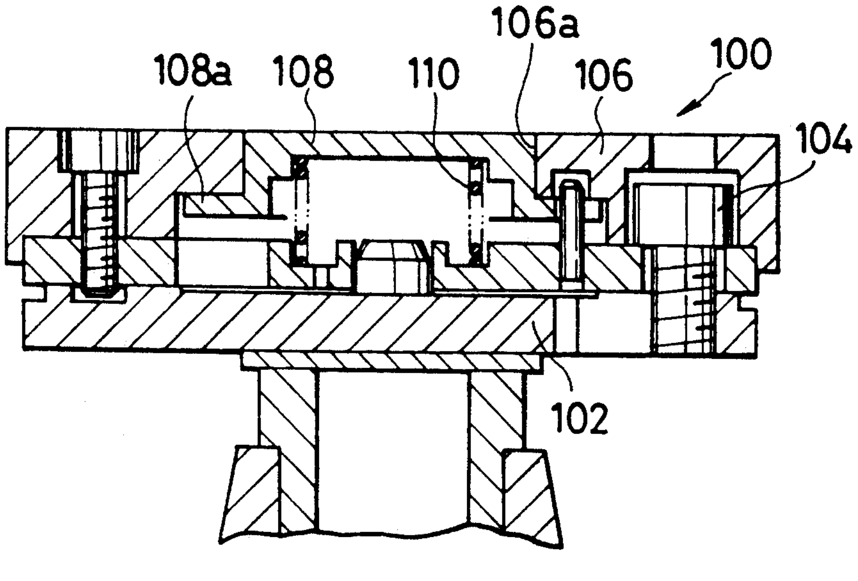
FIG.9 PRIOR ART
FIG. 9 is a longitudinal section of a conventional container positioning apparatus.

FIG. 8 shows a third embodiment in which the spring 76 shown in the second embodiment and which is used to support the container receptacle 62 is replaced by magnets 84, 86. In this embodiment, the container receptacle 62 is centrally provided with a guide *62d* in order to guide the elevating movement of the container receptacle 62, and the magnet 84 is mounted on the lower end of the guide *62d*. The magnet 86 is disposed on the upper surface of the support 66, and these magnets 84, 86 are disposed so that poles of like polarity oppose each other.

While the invention has been shown and described above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A container positioning apparatus comprising a support which carries a plurality of pins in a vertically movable manner, first means for urging each pin upwardly, a container receptacle supported on the support in an elevatable manner and being formed with pin openings through which respective pins can extend, and second means for urging the container receptacle upwardly, the arrangement being such that the container receptacle is depressed with containers placed thereon, whereby those pins which are located directly below the containers are also depressed, allowing remaining pins which are located around the containers to project above the container receptacle, thus positioning and holding the containers in place.

2. A container positioning apparatus according to claim 1 in which the container receptacle has an area which is greater than the outer profile of the greatest one of a variety of containers which are to be positioned thereon.

3. A container positioning apparatus according to claim 1 in which the pins carried by the support are disposed in a manner to surround a variety of containers having different configurations.

4. A container positioning apparatus according to claim 1 in which the first and the second urging means comprise springs.

5. A container positioning apparatus according to claim 1 in which the first and the second urging means comprise magnets.

6. A container positioning apparatus according to claim 1 in which one of the first and the second urging means comprises a spring while the other comprises a magnets.

7. A container positioning apparatus according to claim 1, further including a container holder mechanism located above the container positioning apparatus for holding the top of a container and operatable to depress the container.

8. A container positioning apparatus according to claim 1, further including means for rotating the support.

9. A container positioning apparatus comprising a support carrying a plurality of pins in a vertically movable manner, first means for urging respective pins upwardly, first limit means for limiting the upward movement of the respective pins, an annular body secured to the top of the support, a container receptacle supported within the annular body so as to be elevatable and having pin openings formed therein through which the respective pins can extend, second means for urging the container receptacle upwardly, second limit means for limiting the upward movement of the container receptacle, and guide means for guiding the elevating movement of the container receptacle, the pins and the container receptacle having their upper end faces located substantially in a common plane when they assume at the limit of the upward movement, the downward movement of the container receptacle with containers placed thereon being effective to depress those pins which are located directly below the containers while allowing the remaining pins to project above the container receptacle, whereby these pins which project around the containers being effective to position and hold in place the containers.

* * * * *